Patented Jan. 15, 1924.

1,480,867

UNITED STATES PATENT OFFICE.

TONY SMITH, OF CINCINNATI, OHIO.

COMPOSITION.

No Drawing.   Application filed February 10, 1923.   Serial No. 618,404.

*To all whom it may concern:*

Be it known that I, TONY SMITH, a citizen of the United States, residing at Cincinnati, in the county of Hamilton and State of Ohio, have invented certain new and useful Improvements in Compositions, of which the following is a specification.

My invention relates to improvements in plastic compositions employed in the manufacture of artificial stone blocks, of such a nature as to greatly lessen the cost of the manufacture of these blocks.

A further object of my invention resides in such a composition for the manufacture of artificial stone blocks, wherein when these blocks are molded or otherwise formed into shape, the same will have the appearance of granite blocks.

My composition includes the mixture of granite sand, Portland cement, lime, plaster of Paris and alum in substantially the following proportions, viz:

2% granite sand, 1% Portland cement, 50% lime, 32% plaster of Paris, 15% alum.

In the compounding of these ingredients, the same are thoroughly mixed together in any manner desirable, preferably through the medium of a mortar mixing machine, the same being reduced to a plastic mass by incorporating therewith a sufficient amount of water.

The consistency of this mass is such as to enable the same to be readily poured into block molds of a desired construction and design, the blocks produced from this composition having relatively smooth faces, allowing the same to be highly polished.

After extensive experimenting, I have found that blocks manufactured from the above recited composition will have a close resemblance to natural granite blocks, and although I have herein set forth the specific proportion of ingredients embodying my composition, it is nevertheless to be understood that the same may be changed with respect to each other, without departing from the spirit and scope of the invention as claimed.

Having thus described my invention, what I claim as new, and desire to secure by Letters-Patent is:

In a composition of the class described including substantially 2% granite sand, 1% Portland cement, 50% lime, 32% plaster of Paris and 15% alum, the said ingredients being reduced to a plastic mass through the medium of a sufficient amount of water.

In testimony whereof I affix my signature.

TONY SMITH.